United States Patent
Liu et al.

(10) Patent No.: US 7,973,917 B2
(45) Date of Patent: Jul. 5, 2011

(54) METHOD USING CONCENTRATOR FOR MEASURING LUMINOUS FLUX OF LED

(75) Inventors: Muqing Liu, Shanghai (CN); Xiaoli Zhou, Shanghai (CN); Hai Ping Shen, Shanghai (CN)

(73) Assignee: Fudan University, Shanghai (CN)

( * ) Notice: Subject to any disclaimer, the term of this patent is extended or adjusted under 35 U.S.C. 154(b) by 245 days.

(21) Appl. No.: 12/191,131

(22) Filed: Aug. 13, 2008

(65) Prior Publication Data

US 2009/0066938 A1    Mar. 12, 2009

(30) Foreign Application Priority Data

Sep. 6, 2007 (CN) .......................... 2007 1 0045648

(51) Int. Cl.
*G01J 1/42* (2006.01)
*G01J 1/44* (2006.01)
(52) U.S. Cl. ........................ 356/218; 356/226
(58) Field of Classification Search ........... 356/213–226
See application file for complete search history.

(56) References Cited

U.S. PATENT DOCUMENTS

| | | | | |
|---|---|---|---|---|
| 1,952,210 | A * | 3/1934 | Kenworthy | 356/226 |
| 5,359,192 | A * | 10/1994 | Williams et al. | 250/227.23 |
| 6,721,048 | B2 * | 4/2004 | Yokota et al. | 356/319 |
| 6,734,959 | B2 * | 5/2004 | Griffiths et al. | 356/236 |
| 6,951,401 | B2 * | 10/2005 | Van Hees et al. | 362/612 |
| 6,974,941 | B2 * | 12/2005 | Kuo | 250/205 |
| 7,283,222 | B1 * | 10/2007 | Ohkubo | 356/213 |
| 7,355,685 | B2 * | 4/2008 | Scibona et al. | 356/39 |
| 7,521,667 | B2 * | 4/2009 | Rains et al. | 250/228 |
| 7,532,324 | B2 * | 5/2009 | Liu et al. | 356/326 |
| 7,626,688 | B2 * | 12/2009 | Ou et al. | 356/73 |
| 2007/0152230 | A1 * | 7/2007 | Duong et al. | 257/98 |
| 2008/0081531 | A1 * | 4/2008 | Duong et al. | 445/23 |
| 2008/0266893 | A1 * | 10/2008 | Speier | 362/551 |
| 2009/0066938 | A1 * | 3/2009 | Liu et al. | 356/226 |
| 2009/0309606 | A1 * | 12/2009 | Tseng et al. | 324/501 |
| 2010/0096993 | A1 * | 4/2010 | Ashdown et al. | 315/113 |

OTHER PUBLICATIONS

CIE Technical Report: "Measurement of LEDS," CIE 127-2007 (revised edition of CIE 127-1997). Vienna, Austria. International Commission on Illumination (2007).

* cited by examiner

*Primary Examiner* — Michael P Stafira
(74) *Attorney, Agent, or Firm* — Ladas & Parry, LLP

(57) ABSTRACT

The present invention relates to the technical field of measuring light source, specifically, to the method for measuring the luminous flux of LED. In the present invention, a reflecting cup is used as a collector of the luminous flux of LED. The collector has two sectional openings in the direction perpendicular to the symmetric axis thereof, which are positioned in the front and in the rear respectively, one of them positioned at the bottom end of the collector and having a smaller radius is used to input the light emitted by LED to be measured, the other positioned in the front end of the collector and having a larger radius is used to output the light to the detector placed in this position. Specifically, LED is fixed at the bottom end of the collector with a fixture, the light emitted by LED is directed toward the large opening of the collector, and the photometer is fixed closely at the large opening of the collector to receive light signals. LED is driven with a constant current power supply, and the total luminous flux emitted by LED is concentrated by the collector, collected and measured by the detector, then corrected by using a calibrating coefficient, in order to achieve the numerical readings of the value of the total luminous flux. The method of the present invention is simple and has a high measuring accuracy.

3 Claims, 5 Drawing Sheets

Total flux 2.6974

Total flux 2.6873

METHOD USING CONCENTRATOR FOR MEASURING LUMINOUS FLUX OF LED

BACKGROUND OF THE INVENTION

1. Field of the Invention

The present invention relates to the technical field of measuring light sources, specifically, to the method for measuring the luminous flux of LED.

2. Description of the Related Art

Light Emitting Diode (LED) has the features such as small volume, long lifetime, being driven by low voltage D.C. and excellent monochromaticity; it can be widely applied to the fields of displaying device and special illumination. In theory, LED has high light-emitting efficiency, up to 350~370 lm/W in white LED, for example; therefore, it has a good application prospect in the general illumination market. Among various LED applications, the external quantum efficiency, that is, the ratio of the flux of emitted luminous flux to the input electric power, is an important index for LED. Measuring the external quantum efficiency of LED is difficult in measuring the luminous flux. Owing to the features of LED, up to now, there is no generally-acknowledged and simple method similar to the traditional one for measuring the luminous flux of light sources in the world. There are two methods for measuring the total luminous flux of light sources, namely, the absolute method and the relative method. In the absolute method, the goniophotometer and the like are used to measure the angular intensity distribution of a light source, and the total luminous flux of the light source is calculated based on the distribution. This method can be applied to all kinds of light sources and may achieve high accuracy in principle, but both measurement and calculation are time-and-effort-consuming processes. In the relative method, the total luminous flux is achieved by comparing the light source to be measured with a standard light source whose total luminous flux is known, and the measuring instruments commonly used are an integrating sphere and an illuminometer. Both measurement and calculation of the relative method are simple and practical, so this method is widely applied. However, LED is a semiconductor light source, and its light-emitting mechanism is different from the traditional light source and has its particularity. The following are the problems which will take place when the traditional method using integrating spheroid is used to measure the luminous flux of LED.

(1) The sensitivity of the detector R (λ) does not match the spectral luminous efficiency function V(λ) of human eye In general, the photometer is calibrated by using an incandescent lamp, the average value of the mismatch error (refer as SCF) is evaluated within the range of whole visible lights, and the average error within the range of whole visible lights is defined when the evaluation is carried out. Because the absolute values of V (λ) in the blue wavelength and the red wavelength are very small, the percentage of the error in these wavelengths is much higher than SCF, and the photometer well calibrated in SCF is applicable to measure the light source which emits a continuous spectrum. Because the bandwidth of LED is only 20 nm to 40 nm typically and the peak wavelengths of LEDs of various colors cover the range of visible lights and the adjacent ranges thereof, significant error is still inevitable even if the photometer well calibrated in SCF is used to measure the luminous flux of blue (red) LED.

(2) self-absorption effect of the object in the integrating sphere

In the traditional method using integrating sphere, some objects like the light source to be measured, a baffle, a holder and the like should be placed in the integrating sphere. LED is not only a pure light source, but also an object capable of reflecting and absorbing the light in the sphere, therefore, LED may absorb a portion of light in the sphere and result in the negative error of measurement; the baffle and the holder also inevitably lead to changes in the distribution of light in the sphere, so the theory of integrating spheroid can not be satisfied and principle error of measurement may occur. Because the integrating sphere used to measure LED is typically very small, for example, only 5 cm in diameter, the influence of the self-absorption effect of these objects cannot be ignored.

(3) heat sink

LED is a temperature-sensitive device, the total output luminous flux of which will rapidly decrease as the temperature of the LED rises. Therefore, in order to ensure the stable output luminous flux, it is necessary to sufficiently dissipate the heat from LED in operation, but if LED is placed in the center of the integrating sphere for measurement, the temperature of LED will be raised because the need for heat sink can not be satisfied in the hermetic space inside the integrating sphere, resulting in the unstable light output from LED and the error of the measurement.

Owing to existence of above-mentioned problems, in the current measurement of luminous flux of LED, there are problems such as poor reproducibility, large indefiniteness in measurement, poor consistency in measuring results between different measuring devices and the like.

The problems existing in the measurement of luminous flux of LED are followed with interest from the International Illumination Committee and the industrial associations of various countries. The publication CIE 127-1997 "*Measurement of LEDs*" made some discussion about the measurement of luminous flux of LED and advanced several integrating sphere devices for measuring the luminous flux. In each of these measuring devices, a traditional integrating sphere is used and LED is placed on the surface of the sphere, but a baffle has to be placed inside the sphere in order to shadow light from LED directly to the detector. When the baffle is placed, since the theory of integrating block light from LED directly to the detector cannot be fully satisfied, especially when the integrating sphere is smaller, larger errors will be caused. Therefore, only a standard LED whose distribution is similar to that of the light source to be measured can be used as the standard light source, but this standard LED is very difficult to achieve because of the diverse shapes of light output from LED; at the same time, the degree of difficulty in the measurement is increased.

Recently, in several intermediate conferences of the related technical committee of CIE, the methods for measuring the luminous flux of LED are discussed, but the standard for measuring the luminous flux of LED remains in research all the way. The scientists of the National Institute of Science and Technology (NIST) of the U.S. have made more meticulous researches over the method using integrating sphere for measuring the luminous flux of LED, especially in detail the influences of the baffle inside the integrating sphere and the self-absorption of light source upon the measuring results. It is discovered that the self-absorption will exert a certain influence in the case of a small-sized integrating sphere. At the same time, the influence of the accuracy with which the detector is matched with V (λ) upon the accuracy with which the luminous flux of LED is measured has been also been researched in detail.

The Institute for National Standard of Canada has researched in very detail the method using integrating sphere for measuring LED. In these researches, the method of ray simulation is used to research the difference in the measurements with integrating sphere of the beamed light of LED, and to analyze the influences of the baffle inside the integrating sphere, the self-absorption of light source and the like.

The National Institute of Metrology of P. R. China has made a lot of researches on measuring LED and established the photometric standard of LED at the national level, which fills in the blank in the field of LED photometric measuring in a certain degree. The researchers of Zhejiang University and the Yuanfang Measuring Technology Company in Hangzhou have made a lot of researches on measuring LED and advanced the method for measuring the luminous flux through LED spectrum correction, as well as researched the subject of self-absorption during the measurement of the luminous flux of LED.

Recently, Fudan University has also made a lot of researches on measuring LED and advanced a method using integrating sphere that adopts a narrow beam standard light source, and in this method, a light source to be measured and a standard light source are placed on the surface of the integrating sphere, and the relative spectrum distribution of LED is measured with CCD spectrometer and the value of the luminous flux is therefore calculated. Although this method can eliminate the influence of the matching error of V (λ) upon the measuring results and relieve the influence of the heat sinking in a certain degree, yet because the integrating sphere for measuring the luminous flux of LED is typically small-sized and at least two holes should be opened thereon, one for placing LED to be measured and the other for the fiber interface, the integrating sphere will be deviated from the ideal integrating sphere and therefore the measuring errors will still exist.

To sum up the current researches on measuring the luminous flux of LED, it is discovered that these researches are still using the traditional methods with integrating sphere for measuring the light source; while larger errors exist in the measurement of the luminous flux of LED using the integrating sphere, these methods can not form a standard and be popularized. According to the features of LED, that is, LED is small in size and emits light in a solid angle of 2π, the present invention advances a novel measuring method, in which a reflecting cup is used as a collector to concentrate the light emitted from LED, and then the luminous flux thereof is measured by a detector.

SUMMARY OF THE INVENTION

The purpose of the present invention is to provide a simple and convenient method for measuring accurately the luminous flux of LED.

In the method of the invention for measuring the luminous flux of LED, a reflecting cup is used as a concentrating device for concentrating the luminous flux of LED. LED is fixed on the bottom end of the reflecting cup with a fixture, and an photometric detector is provided at the opening in the front end of the reflecting cup; when LED is driven by a constant current, the luminous flux of LED can be measured by the detector and displayed.

Fixtures with different structures are used to match LEDs of visible light in different packages, so as to ensure that the light-emitting center of the LEDs of visible light is positioned in the vicinity of the bottom end of the reflecting cup. The reflecting cup is used as a concentrating device for concentrating the luminous flux of LED of visible light, and a reflecting membrane with 98% reflectance is vapor-deposited on the inner wall of the reflecting cup. A silicon photoelectric cell is used as a detector, and a cosine corrector and a V (λ) correcting plate are provided on the incident surface of the detector. The detector is engaged closely with the exit of the collector so as to ensure the emitted light will fall wholly within the detecting range of the photoelectric cell In order to avoid the influence of the reflected light of V (λ) correcting plate, an attenuating plate is provided in the front of V (λ) correcting plate, so that 10% of the lights passing through the attenuating plate is transmitted.

In the present invention:
1. Fixtures with different structures are used to match LEDs of visible light in different packages, in order to ensure that the light-emitting center of the LEDs of visible light is positioned in the vicinity of the bottom end of the reflecting cup.
2. The reflecting cup is used as a concentrating device for concentrating the luminous flux of LED of visible light, and a reflecting membrane with the 98% reflectance is vapor-deposited on the inner wall of the reflecting cup.
3. A silicon photoelectric cell is used as the detector of the luminous flux, and a cosine corrector and a V (λ) correcting plate are provided on the incident surface of the detector. The detector is engaged closely with the exit of the reflecting cup so as to ensure the emitted light will fall wholly within the detecting range of the photoelectric cell.
4. In order to avoid the influence of the reflected light of V (λ) correcting plate, an attenuating plate is provided in the front of V (λ) correcting plate, so that 10% of the light passing through the attenuating plate is transmitted. Structure of the photometer is shown in FIG. 2.

Figure 1:
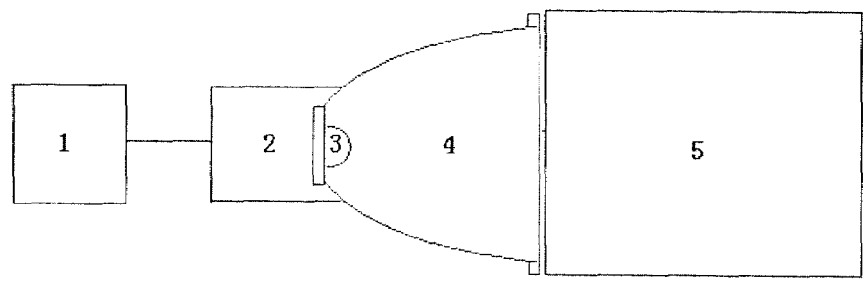
FIG. 1 is a schematic view of the system for measuring the total luminous flux of LED.
Figure 2:
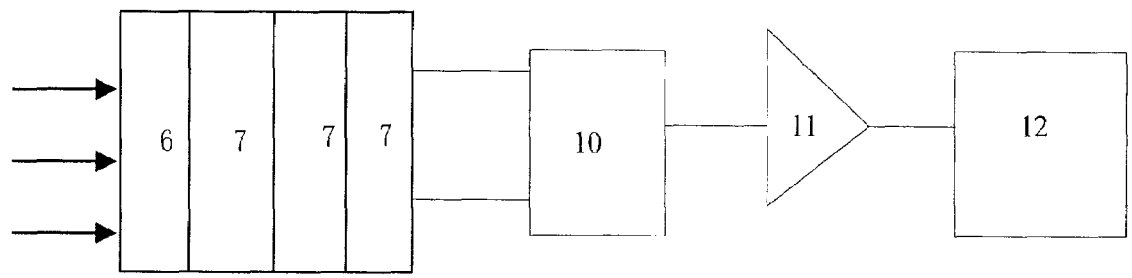
FIG. 2 is a structural schematic view of the photometer with silicon photoelectric cell

In the drawings, (1) is a constant current power supply, (2) is a LED fixture, (3) is LED to be measured, (4) is a light collector, (5) is a photometer, (6) is an attenuating plate, (7) is a cosine corrector, (8) is a V (λ) correcting plate, (9) is a detector, (10) is a current/voltage converting circuit, (11) is an amplifier, and (12) is a display.

DETAILED DESCRIPTION OF THE INVENTION

The following are the components which are used in the present invention:

LED (3): the LED light source to be measured;

reflecting cup (4): the reflecting cup for concentrating the luminous flux of LED, the basic principle is that a reflecting membrane with a high reflectivity (higher than 98%) is vapor-deposited on the inner surface of the cup to form a reflecting surface, which reflects the incident light to the direction of a large opening to concentrate the light. The specific shape of the cup body may be the shapes capable of effecting the function of concentrating light, such as cone body, symmetric rotating body with a parabola as the generatrix, and the like;

power supply (1): the constant current power supply;

photometer (5): the photometer with silicon photoelectric cell as the detector;

The process of assembling the instruments is as follows:

As shown in FIG. 1, LED (3) to be measured is fixed in the position at the bottom end of collector (2) by a fixture. The detecting surface of the silicon photoelectric cell 1 of photometer (5) is provided to be right close to the exit of the collector.

The photometer (5) comprises an attenuating plate (6), a cosine corrector (7), a V (λ) correcting plate (8) and a photoelectric detector (8) as well as the succeeding circuits including current/voltage converting circuit (10), operational amplifier (11) and display (12).

EXAMPLES

The design and the measuring process of the present invention will be described with the specific form of a reflecting cup (Compound Parabolic concentrator (CPC)) as an example.

The compound parabolic concentrator (CPC) is a non-imaging optical collector designed according to the principle of the edge optics, and is typically applied to the collection of solar energy. The reflecting surface of a three-dimensional compound parabolic collector is formed by rotating a two-dimensional parabolic profile around the symmetric axis. The equations of the profile are as follows:

$$y(\Phi) = \frac{2f\sin(\Phi - \theta_{max})}{1 - \cos\Phi} - a \quad (1)$$

$$z(\Phi) = \frac{2f\cos(f - \theta_{max})}{1 - \cos\Phi} \quad (2)$$

$$\text{wherein } f = a(1 + \sin\theta_{max}) \quad (3)$$

Figure 3:
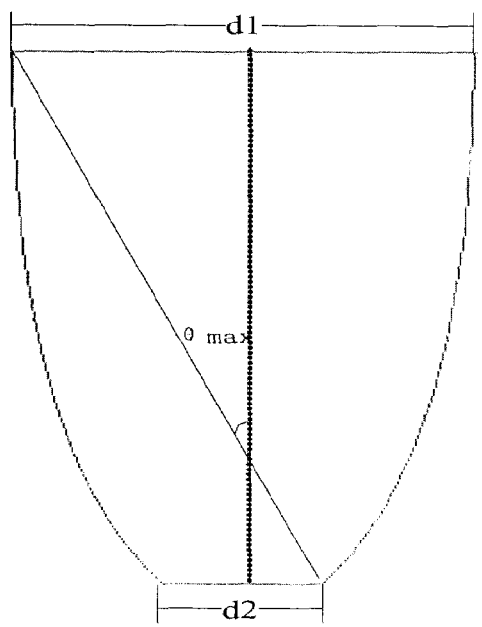
FIG. 3 is a schematic view of the profile of CPC collector.

$\theta_{max}$ is maximum incident angle of the light, a is radius of the exit, $\Phi$ is a variable parameter.

$$c = \left(\frac{d_1}{d_2}\right)^2 \quad (4)$$
$$= \sin^2\theta_{max}$$

wherein $d_1$ and $d_2$ are the entrance diameter and the exit diameter respectively, and $d_2=2a$, as shown in FIG. 3.

As long as the optical deviating angle is smaller than $\theta_{max}$, the light can reach the exit through at most one time of reflection. For the light whose deviating angle is smaller than $\theta_{max}$, the efficiency of energy collection becomes the highest.

According to the reversible principle of the optics, in the present invention, the LED light source is placed at the exit of the CPC, the light emitted from the light source is reflected and emitted from the entrance inevitably. Meanwhile, the maximum angle of the emitted light is $\theta_{max}$, thus the CPC plays the function of light collection. At the same time, almost all lights are reflected once at most, therefore, the light utilization ratio of this kind of CPC will be much higher than that of other types of optical collector.

Figure 4:
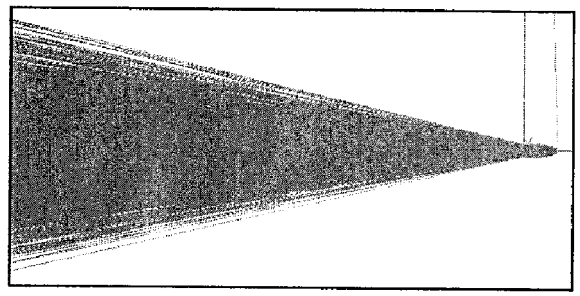
FIG. 4 is a ray view of CPC collector which emits light at the angle of 15 degrees.

In order to make the intensities of the lights which pass through the attenuating plate and reach the detector in different angles as equal as possible, the parameters of the compound parabolic collector are adjusted in Tracepro software so as to minimize the angle of the light output from the collector, and the LED should be placed at the focus of the CPC, that is, the focus of CPC should be positioned on the plane of the opening. According to the calculation with allowable error of 3%, the angle of the light output from the collector should be 15 degrees. The CPC model is established in Tracepro software, as shown in FIG. 4.

A. Main devices Required for the Measurement

1. LED Fixture

In order to match the packaging forms of current main-trend LEDs of visible light, different packaging types and different packaging sizes are matched with different fixtures to ensure that the light-emitting center of the LED of visible light is positioned in the position at the bottom end of CPC (on the focus plane).

2. CPC Collector

A reflecting membrane with 98% reflectance is vapor-deposited on the inner wall of the cup body.

3. Detector

The silicon photoelectric cell is used as a detector, and a cosine corrector and a V (λ) correcting plate are provided in the front of the incident surface of the detector. The detector is engaged closely with the exit of the collector so as to ensure the emitted light will fall wholly within the detecting range of the photoelectric cell, and in order to avoid the influence of the reflected light of V (λ) correcting plate, an attenuating plate is provided in the front of V (λ) correcting plate, so that 10% of the light passing through the attenuating plate is transmitted.

B. The Simulation of Model Established in the Software

Figure 5:
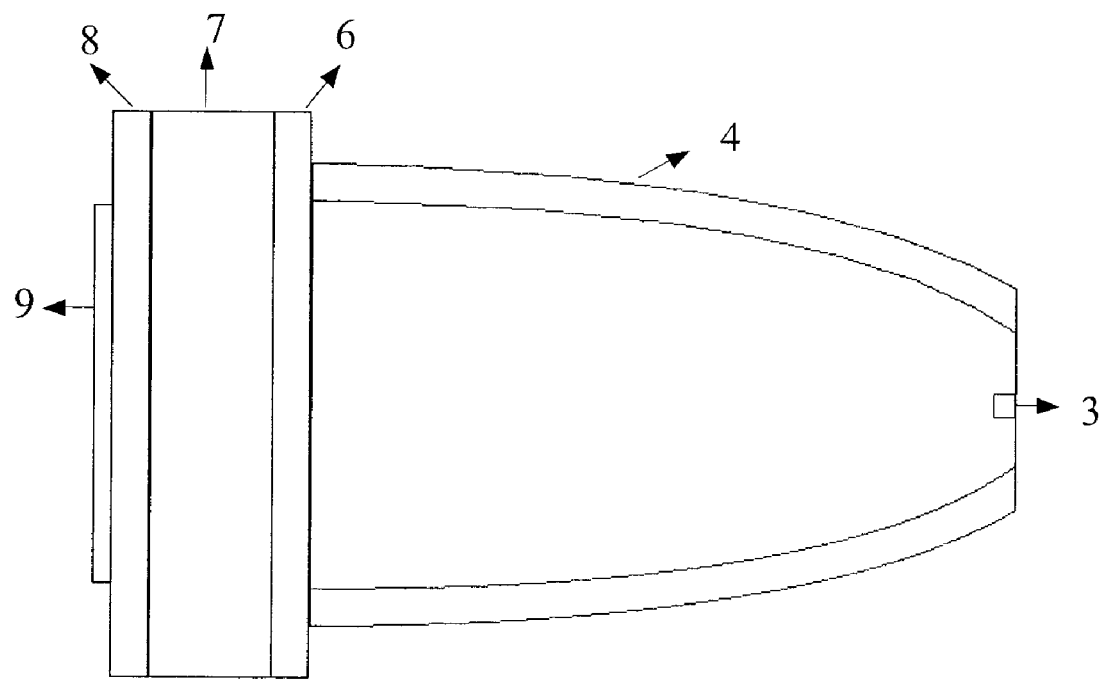
FIG. 5 is a schematic view of a system model established in TRACEPRO.

As shown in FIG. 5, the models of the respective components in the system are established in Tracepro software. The reflectance of the inner wall of CPC is set to 98%, LED is a planar light-emitting body with 1 mm×1 mm dimensions, and the material property of the attenuating plate is set to be of 90% absorptance and 10% transmitance; the surface of V (λ) correcting plate is set to have reflectance of 50%; the surface of the cosine corrector is set to a diffuser; the detector has 10 mm×10 mm dimensions and its surface is set to have reflectance of 50%. The values of luminous flux produced on the surface of the detector by LEDs having different distributions are simulated according to the established system models.

Figure 6:
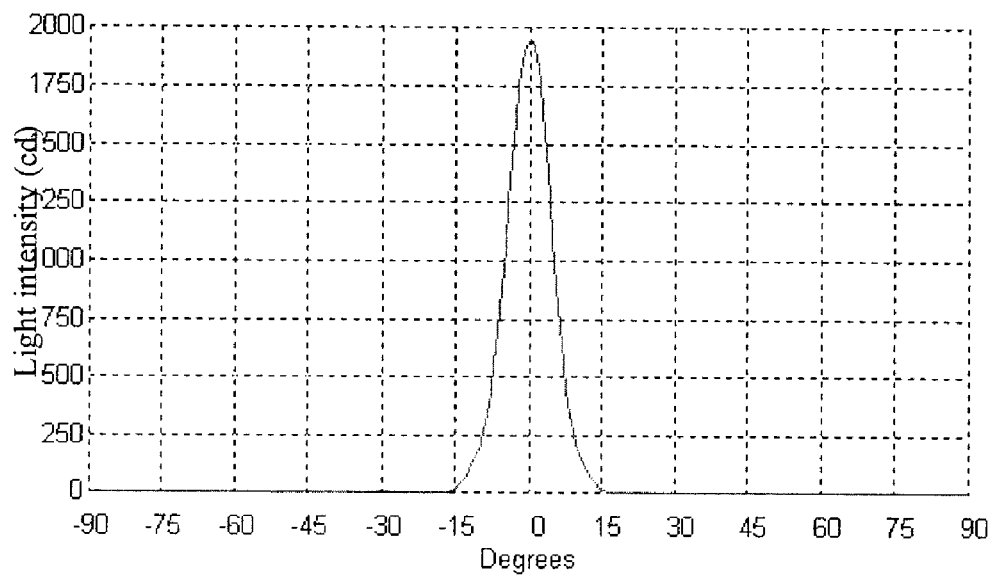
FIG. 6 is a graph of the distribution of LED which emits light at the angle of 15 degrees.
Figure 7:
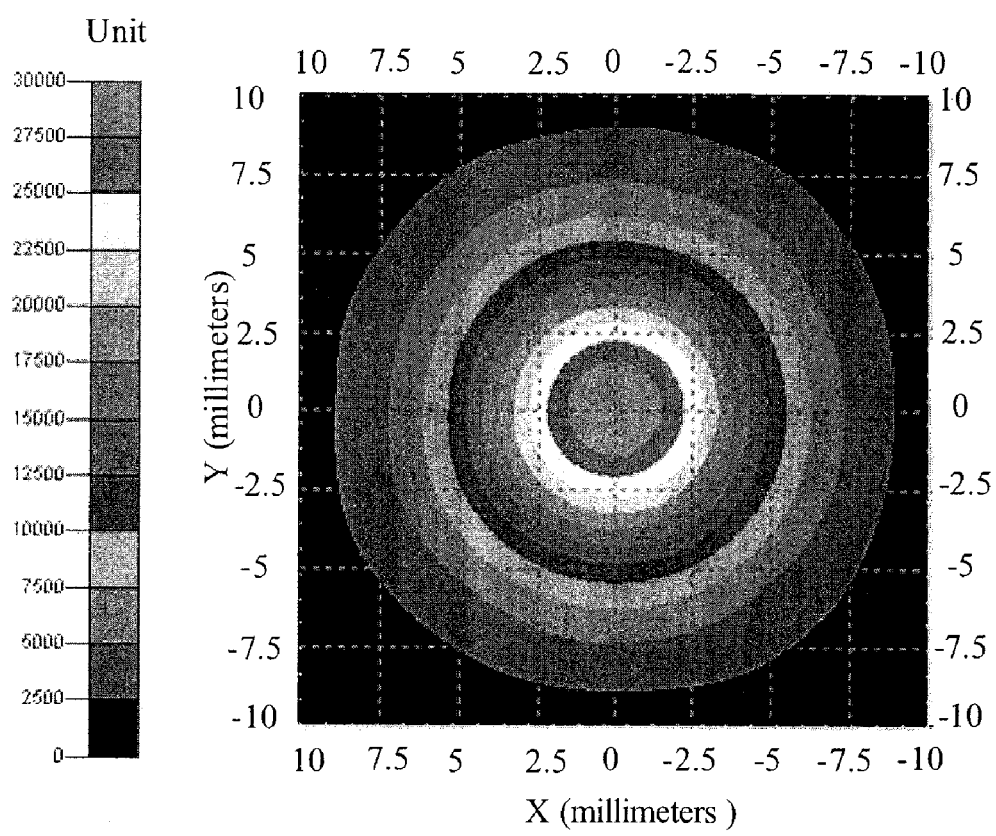
FIG. 7 is a simulating result of LED which emits light at the angle of 15 degrees.
Figure 8:
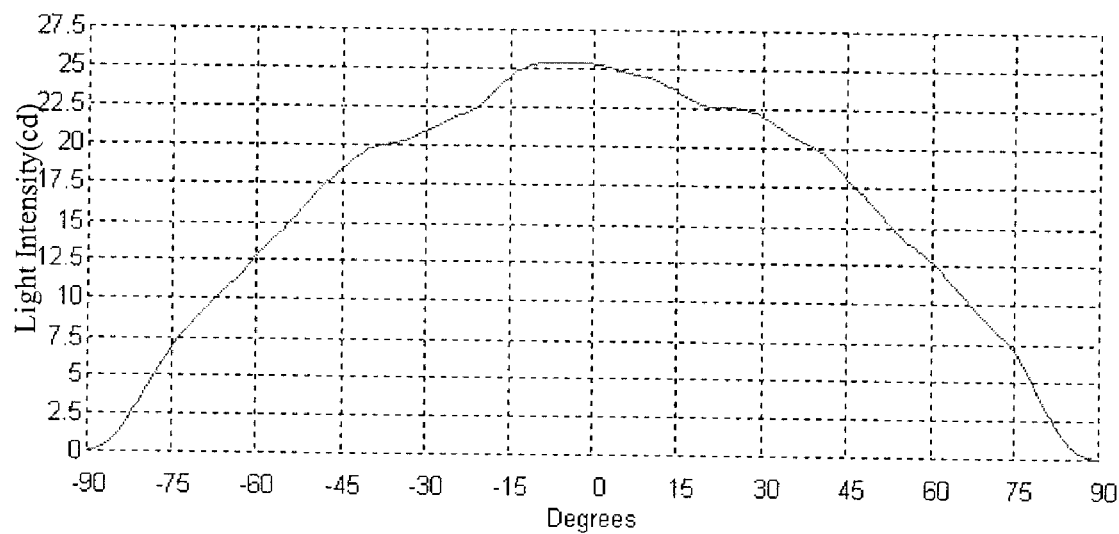
FIG. 8 is a graph of Lambert distribution of LED.
Figure 9:
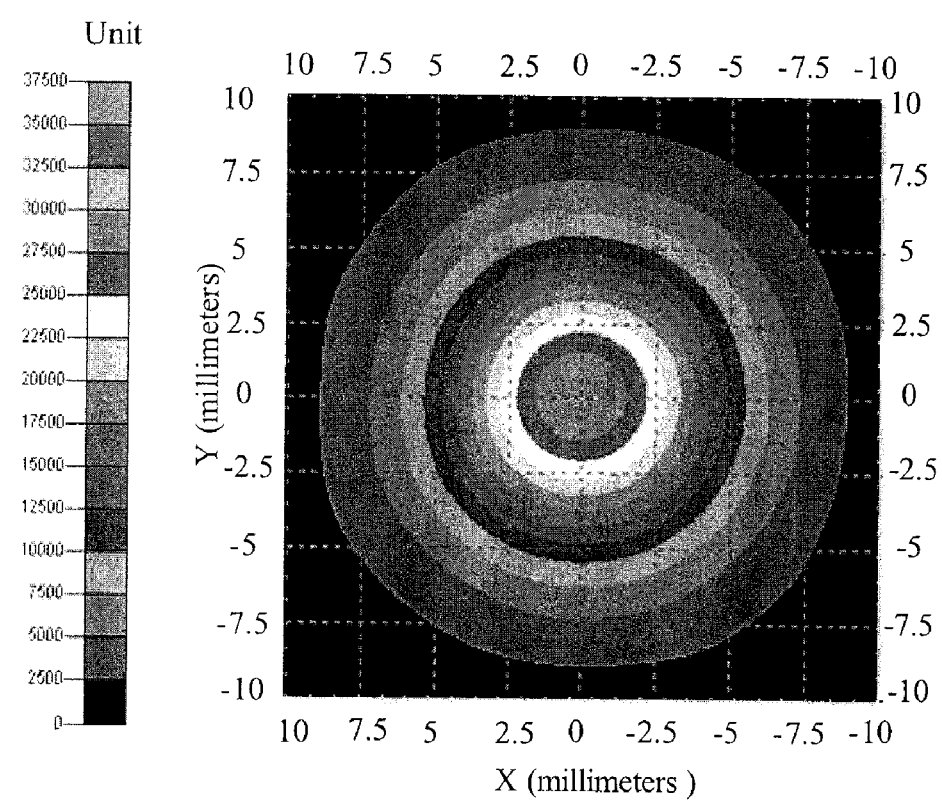
FIG. 9 is a simulating result of Lambert distribution of LED.
Figure 10:
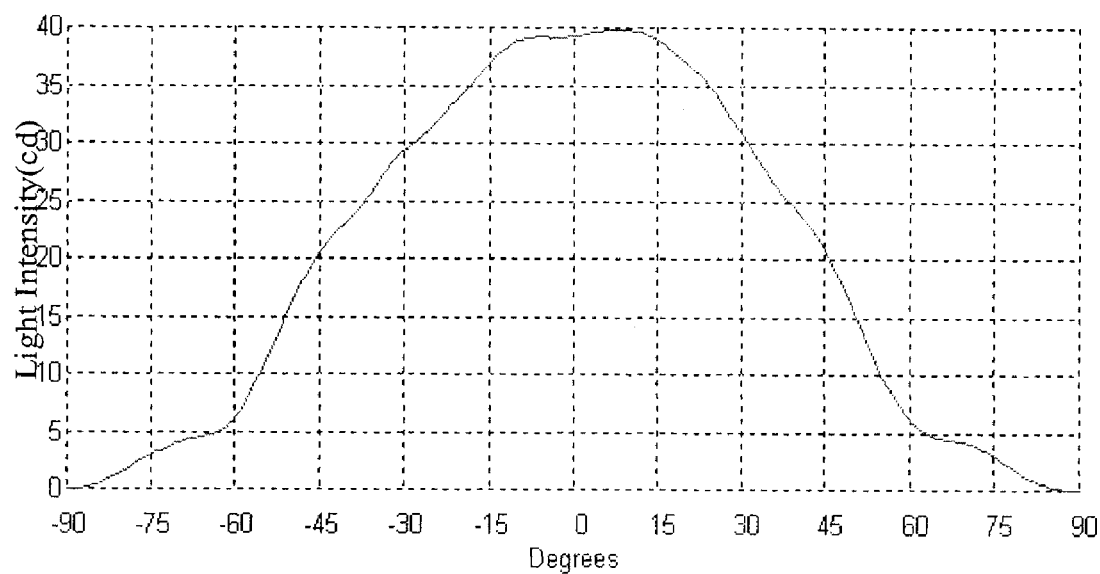
FIG. 10 is a graph of the distribution of Cree Xlamp XR-E.
Figure 11:
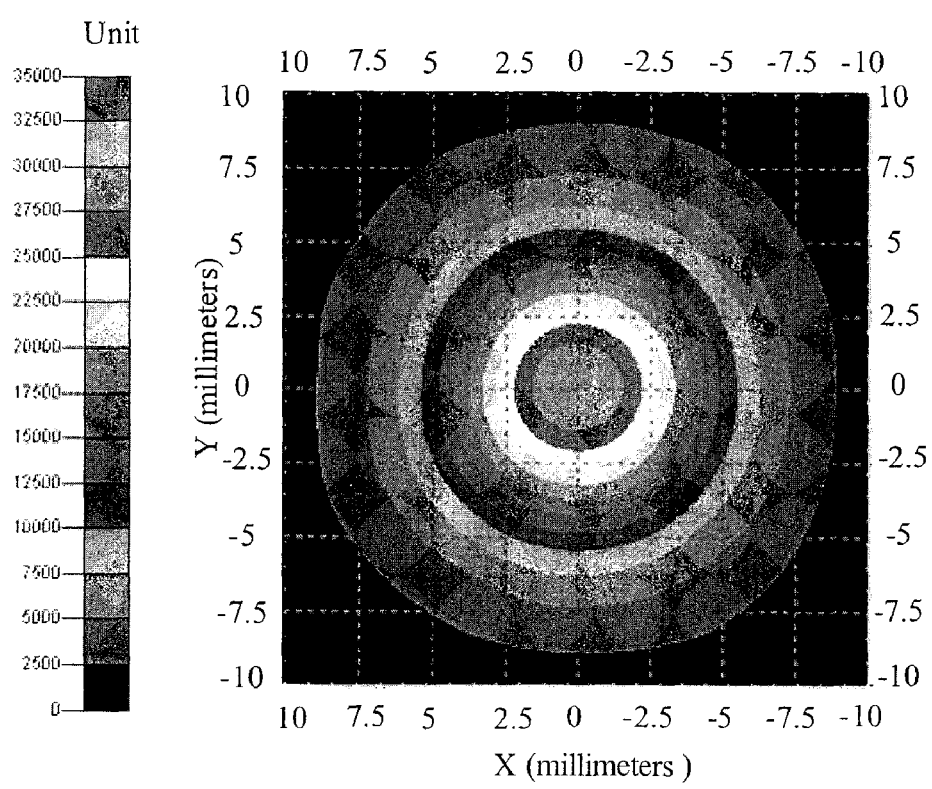
FIG. 11 is a simulating result of Cree Xlamp XR-E.

1) The light-emitting surface of the LED is set to be an absorptive surface, the value of the luminous flux thereof is set to 80 lm, the light-emitting angle is set to 15 degrees, the graph of distribution of LED which emits light in 15 degrees is as shown in FIG. 6, and 100,000 rays are simulated in Tracepro software. The simulating result is as shown in FIG. 7. The value of flux detected on the detector is 2.7381 lm;

2) The light-emission of LED is set to Lambertian, the value of the luminous flux is set to 80 lm, the graph of distribution of LED is as shown in FIG. 8, and 100,000 rays are simulated. The simulating result is as shown in FIG. 9. The value of flux detected on the detector is 2.6947 lm;

3) the sample is a market-available Cree Xlamp XR-E 1 W LED of white light, the graph of distribution thereof as shown in FIG. 10 is measured by a goniophotometer, the graph of distribution thereof is input to Tracepro, the value of the luminous flux is set to 80 lm, and 100,000 rays are simulated. The simulating result on the detector is as shown in FIG. 11. The value of flux detected on the detector is 2.6873 lm.

The comparisons of the simulating results are as shown in Table 1. The error rate between the simulating results of Lambertian LED and 15 degrees narrow beam LED is 1.6% while the error between the simulating results of 15 degrees narrow beam LED and the actual sample is 1.9%. These simulating results indicate that this method is practical, and the error between the simulating results of LEDs which emit light in different angles is relatively small.

Table 1 Comparison Between Simulating Results of LEDs Emitting Light in Different Angles

| Type of LED | Flux Detected on Detector |
|---|---|
| narrow beam (15 degrees emitting angle) | 2.7381 |
| Lambertian emission | 2.6947 |
| Cree Xlamp XR-E | 2.6873 |

C. The Process of the Experimental Measurement

The measuring device is as shown in FIG. 1, the environmental temperature is 25° C., several high-power LEDs made by different factories are measured and the measuring results are compared with those achieved on the miniature LED goniophotometer LED626 made by Hangzhou Yuanfang Photoelectric Information Corporation Ltd., wherein these two methods are performed in the same measuring conditions, each of the LED is drived by an accurate constant current power supply and the driving current is set to 350 mA. The measuring and comparing results are as shown in Table 2. Seven high-power LEDs have been measured. As shown in Table 2, compared with the measuring results achieved on the goniophotometer, the relative errors between the measuring results of the method for measuring the luminous flux of LED on the basis of CPC collector of the present invention and the former are all within the range of 5%, indicating that the method of the present invention has higher accuracy.

TABLE 2

Comparison between Measuring Results of Method of the Present Invention and goniophotometer

| serial number | measuring results of goniophotometer (lm) | measuring results of CPC (lm) | relative error |
|---|---|---|---|
| 1 | 61.83 | 63.821 | 3.22% |
| 2 | 40.36 | 39.216 | 2.83% |
| 3 | 61.84 | 61.232 | 0.99% |
| 4 | 70.17 | 72.46 | 3.26% |
| 5 | 39.05 | 37.287 | 4.73% |
| 6 | 41.67 | 39.893 | 4.45 |
| 7 | 50.54 | 51.903 | 2.69% |

The invention claimed is:

1. A method for measuring the luminous flux of a LED, comprising:

driving the LED by a power supply;

placing the LED in the position at a bottom end of a reflecting cup with a fixture;

placing a detector near a large opening of the reflecting cup; and measuring the luminous flux of the LED by using the detector;

wherein the detector is a silicon photoelectric detector and the detector placed near the large opening of the reflecting cup, such that a portion of light directly illuminates the silicon photoelectric detector and the remaining portion of light is reflected to the silicon photoelectric detector by the reflecting cup on whose inner surface a reflecting membrane with a reflectance over 98% is coated, which concentrates the luminous flux.

2. A method for measuring the luminous flux of a LED, comprising:

driving the LED by a power supply;

placing the LED in the position at a bottom end of a reflecting cup with a fixture;

placing a detector near a large opening of the reflecting cup; and measuring the luminous flux of the LED by using the detector;

wherein the detector is a photometer probe and the photometer probe is placed near the large opening of the reflecting cup so as to receive the directly illuminated light and the reflected light via the reflecting cup of LED so as to receive the luminous flux and convert the optical signals to the electrical signals; and wherein the photometer probe comprises an attenuating plate, a cosine corrector, a $V(\lambda)$ correcting plate, a photoelectric detector, a current/voltage converting circuit, an operational amplifier and a display, wherein the $V(\lambda)$ correcting plate is used to effect the matching and response between the detector and the spectral luminous efficiency function of human eye, and the cosine corrector is used to correct the response of the optical signal in different directions.

3. A method according to claim 1 or 2, wherein the reflecting cup is a specular reflector without diffusion.

* * * * *